United States Patent [19]

Dube et al.

[11] 4,382,859
[45] May 10, 1983

[54] WATER CONSERVATION AND WASTE WATER TREATMENT SYSTEM

[75] Inventors: Gerald W. Dube, Windsor; Paul B. Strycharz, Rockville; Ross G. Steiger; Douglas N. Johnston, both of West Willington, all of Conn.

[73] Assignee: Litton Industrial Products, Inc., East Hartford, Conn.

[21] Appl. No.: 338,369

[22] Filed: Jan. 11, 1982

[51] Int. Cl.³ .......................... B01D 21/24; C02B 1/30
[52] U.S. Cl. ................................... 210/96.1; 210/139; 210/142; 210/257.1; 134/109
[58] Field of Search ....................... 210/96.1, 101, 139, 210/138, 142, 201, 202, 257.1; 134/88, 109

[56] References Cited

U.S. PATENT DOCUMENTS

| | | | |
|---|---|---|---|
| 3,393,149 | 7/1968 | Conley et al. | 210/139 X |
| 3,825,494 | 7/1974 | Call et al. | 210/142 X |
| 3,920,550 | 11/1975 | Farrell et al. | 210/96.1 |
| 4,016,079 | 4/1977 | Severin | 210/96.1 |

Primary Examiner—John Adee
Attorney, Agent, or Firm—Brian L. Ribando

[57] ABSTRACT

A water conservation system for a plating line comprising a series of treatment tanks and a plurality of rinse tanks utilizes timed inlets for admitting fresh water to each of the rinse tanks for a short period of time immediately following the introduction of a part into the rinse tanks. A sediment tank receives the discharge from each of the rinse tanks via overflow ducts, and a holding tank receives overflow from the sediment tank. The contents of the holding tank are transferred to a treatment tank for batch treatment. A logic circuit controls sampling and testing of the treatment tank to determine the PH condition thereof and to initiate the addition of a predetermined amount of an appropriate neutralizer to the treatment tank.

2 Claims, 1 Drawing Figure

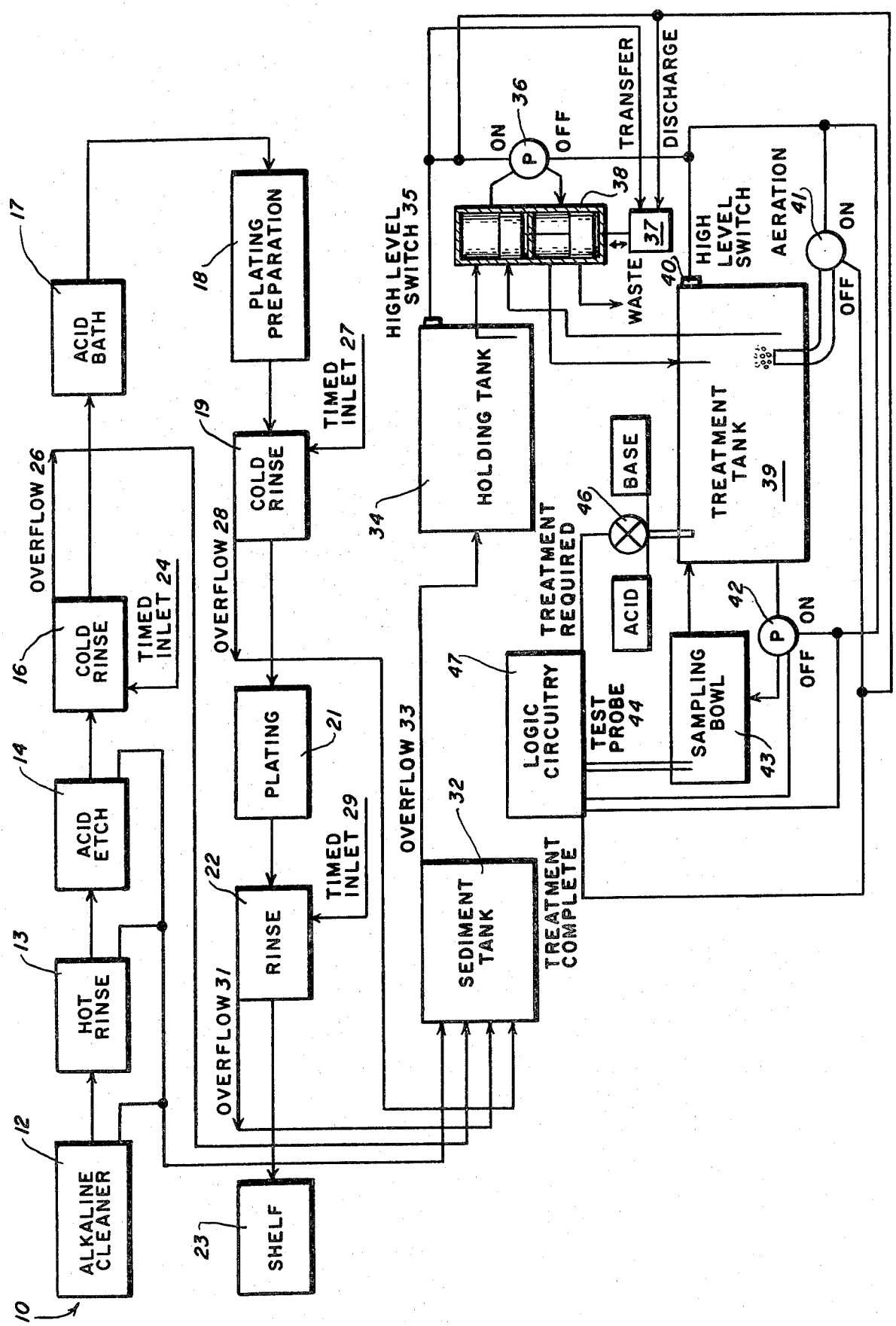

WATER CONSERVATION AND WASTE WATER TREATMENT SYSTEM

BACKGROUND OF THE INVENTION

Industrial plating systems utilize a series of tanks into which parts to be plated are sequentially dipped. These tanks contain cleaners, etching solutions, plating preparations, plating solutions, and finishing solutions. For optimum plating results, the parts must be thoroughly rinsed between certain of the solution treatments. This rinsing also prevents the contamination of one solution tank by the residue solution carried by the part from a previous solution tank. Since the plating solutions may be very expensive, the latter function of the rinsing process is as important as the former.

A water rinse comprising pure water is often used between certain solution treatments. In order to maintain the purity of the water, it is common to have fresh water continually entering the bottom of a rinse tank with an overflow trough used to skim excess sludge and contaminants from the top of the tank. The impurities from the rinse tank must be treated and neutralized before being discharged into a sewer system. This is usually accomplished by continually measuring the PH in the discharge flow and adding a base or an acid as may be appropriate to effect neutralization.

The above-described process is not entirely satisfactory. The continual running of pure water into the rinse tanks results in a tremendous amount of water being used daily in order to keep the system operative. Further, the addition of a neutralizer to the discharge flow on a continual basis as required by the PH level in the discharge flow does not satisfactorily neutralize the discharge since the PH levels may change rapidly.

SUMMARY AND OBJECTS OF THE INVENTION

It is therefore an object of the present invention to provide a rinsing system for a plating line which does not require a continuous supply of fresh water.

It is another object of the invention to provide a waste water treating system for a plating line wherein the waste water is treated on a batch basis rather than on a continual basis.

These and other objects of the invention will become apparent from the following detailed description taken in conjunction with the accompanying drawing FIGURE in which like reference numerals disignate like or corresponding parts throughout the FIGURE.

FIG. 1 shows in block diagram form a plating line embodying the principles of the instant invention.

DESCRIPTION OF THE PREFERRED EMBODIMENT

FIG. 1 shows in block diagram form a plating line 10 which comprises a plurality of treatment tanks. In the plating line which is shown, a part is first subjected to an alkaline cleaner 12 followed by a hot rinse 13, and an acid etch 14. An acid bath treatment normally follows the acid etch 14 but it is desirable to rinse the part before subjecting it to the acid bath. A cold rinse 16 is used for this purpose and is interposed between the acid etch 14 and the acid bath 17. The part is subjected to a plating preparation 18 following the acid bath 17 and thereafter a second cold rinse 19 before actual plating 21. Following the plating 21, a third rinse 22 is normally provided, after which the part may be dried and put onto a shelf.

According to the instant invention, each cold rinse 16, 19, and 22 is effected by admitting fresh water through a bottom inlet in each rinse tank for a measured period of time. During this time, waste water, sludge, and other contaminants are skimmed from the top of each rinse tank by an overflow device. Accordingly, cold rinse tank 16 includes an inlet 24 and an overflow 26, cold rinse tank 19 includes an inlet 27 and an overflow 28, and cold rinse tank 22 includes an inlet 29 and an overflow 31.

In actual practice, it has been found that a satisfactory rinse can be obtained by a 40 second immersion of a part into the rinse bath which is being simultaneously supplied with fresh water. Therefore, it is only necessary to admit fresh water to a rinse tank for 40 seconds. Such rinsing may be controlled by a timer which is started manually or by a fluid level sensor in each rinse tank which senses the introduction of a part into the tank.

In order to treat the overflow rinse water, the overflow from the three rinse tanks is ducted to a sediment tank 32 which traps a high percentage of the solid contaminants which are present. The fluid contents of the alkaline cleaner tank 12, the hot rinse tank 13, and the acid etch tank 14 may also be periodically ducted to the sediment tank 32 when it is desired to renew the respective solutions therein. As the sediment tank 32 becomes filled, the overflow 33 therefrom is ducted to a large capacity holding tank 34.

The holding tank 34 collects overflow water until it has been filled, triggering a high level switch 35. The high level switch 35 activates a pump 36 and valve control element 37 for a spool valve 38. The pump transfers the contents of the holding tank 34 to a treatment tank 39. The treatment tank 39 has a capacity which is equal to the holding tank 34 and a second high level switch 40 in the treatment tank 39 turns the pump 36 off when the treatment tank has been filled.

The second high level switch 40 may also be used to activate an aeration device 41 which aerates the contents of the treatment tank 39 and a sampling pump 42 which circulates liquid from the treatment tank 39 to a sampling bowl 43.

At appropriate intervals, logic circuitry 47 turns off the sampling pump 42 and activates a test probe 44 to determine the chemical characteristics of the contents of the sampling bowl 43. After this measurement by the test probe 44, a unit amount of acid or base is added to the treatment tank 39 through a timer controlled valve 46 which is connected to supply tanks of the appropriate chemicals. The logic circuitry 47 then restarts the sampling pump 42, and after another interval of time, stops the sampling pump 42 and activates the test probe 44. If required, an additional unit amount of acid or base is added to the treatment tank 38, and this process is repeated until the PH of the contents of the treatment tank has reached an acceptable level. The logic circuitry turns off the aeration device 41, activiates the valve control element 37, and turns on the pump 36 which discharges the contents of the treatment tank 39 to a waste receiver.

In actual practice, a plating system as above described but utilizing three rinse tanks continually flushed with fresh water required 6,000 gallons of water per day. Treating the continuous overflow from the rinse tanks on a batch basis resulted in eight batches a day being processed because of the high volume of water discharged by the rinse tanks. According to the invention, if fresh rinse water is provided only for a short period of time following the introduction of the part into the rinse tank, the system requires less than 800 gallons of water a day, and the total daily overflow from the rinse tanks can be neutralized in a single treatment batch.

What is claimed is:

1. A water conservation system for a plating line wherein the plating line comprises a series of treatment tanks and a plurality of rinse tanks interposed between selected ones of said treatment tanks, the system comprising timed inlets for admitting fresh water to each of said rinse tanks for a short period of time immediately following the introduction of a part into said rinse tanks, overflow ducts for each of said rinse tanks, a sediment tank for receiving the discharge from each of said rinse tanks via said overflow ducts, a holding tank, said holding tank receiving overflow from said sediment tank, a treatment tank, means responsive to a full condition in said holding tank for transferring the contents thereof to said treatment tank, logic means, testing means responsive to said logic means for determining the PH condition of said treatment tank, and means for adding a predetermined amount of an appropriate neutralizer to said treatment tank.

2. The water conservation system for a plating line as in claim 1, further comprising timing means in said logic means, said timing means and said logic means causing said testing means and said means for adding to operate repeatedly until the contents of the treatment tank become neutralized, and means to discharge the contents of said treatment tank in response to the neutralization of said contents.

* * * * *